(12) United States Patent
Huang

(10) Patent No.: US 12,520,259 B2
(45) Date of Patent: Jan. 6, 2026

(54) INITIAL ACCESS METHOD AND APPARATUS

(71) Applicant: HUAWEI TECHNOLOGIES CO., LTD., Guangdong (CN)

(72) Inventor: Huang Huang, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 343 days.

(21) Appl. No.: 18/316,362

(22) Filed: May 12, 2023

(65) Prior Publication Data

US 2023/0284161 A1    Sep. 7, 2023

Related U.S. Application Data

(63) Continuation of application No. PCT/CN2021/129596, filed on Nov. 9, 2021.

(30) Foreign Application Priority Data

Nov. 13, 2020 (CN) .......................... 202011271035.0

(51) Int. Cl.
*H04W 56/00* (2009.01)
*H04B 7/06* (2006.01)

(52) U.S. Cl.
CPC .... *H04W 56/0015* (2013.01); *H04B 7/06968* (2023.05)

(58) Field of Classification Search
None
See application file for complete search history.

(56) References Cited

U.S. PATENT DOCUMENTS

| 2020/0154377 | A1* | 5/2020 | Qian | H04W 72/0446 |
| 2020/0404601 | A1* | 12/2020 | Lin | H04L 1/0072 |
| 2022/0173859 | A1* | 6/2022 | Chai | H04L 5/0053 |

FOREIGN PATENT DOCUMENTS

| EP | 3471498 A1 * | 4/2019 | ........ H04W 74/0866 |
| EP | 3866374 A1 * | 8/2021 | ........... H04L 5/0048 |
| EP | 4027532 A1 * | 7/2022 | ........ H04W 74/0833 |
| WO | WO-2022031702 A1 * | 2/2022 | ........... H04B 7/0695 |

OTHER PUBLICATIONS

3GPP TS 38.211 V16.3.0, "3rd Generation Partnership Project; Technical Specification Group Radio Access Network; NR; Physical channels and modulation (Release 16)," Sep. 2020, 133 pages.
Apple Inc., "On DL Signals and Channels for NR-U," 3GPP TSG RAN WG1 Meeting #94, R1-1808612, Gothenburg, Sweden, Aug. 20-24, 2018, 4 pages.

(Continued)

*Primary Examiner* — Anh Vu H Ly
(74) *Attorney, Agent, or Firm* — Fish & Richardson P.C.

(57) ABSTRACT

This application provides initial access methods and apparatuses. One method includes: detecting, in M synchronization signal blocks (SSBs) sent by a network device, one or more first SSBs, wherein the M SSBs are sent at a same time on different frequencies, the M SSBs comprise N first SSBs located in a synchronization raster, where N is a positive integer, and sending a random access signal to the network device based on frequency domain positions of the detected one or more SSBs in the M SSBs or in the N first SSBs.

20 Claims, 6 Drawing Sheets

(56) References Cited

OTHER PUBLICATIONS

3GPP TS 38.213 V16.3.0, "3rd Generation Partnership Project; Technical Specification Group Radio Access Network; NR; Physical layer procedures for control (Release 16)," Sep. 2020, 179 pages.
International Search Report and Written Opinion in International Appln. No. PCT/CN2021/129596, mailed on Dec. 20, 2021, 15 pages (with English translation).

* cited by examiner

INITIAL ACCESS METHOD AND APPARATUS

CROSS-REFERENCE TO RELATED APPLICATIONS

This application is a continuation of International Application No. PCT/CN2021/129596, filed on Nov. 9, 2021, which claims priority to Chinese Patent Application No. 202011271035.0, filed on Nov. 13, 2020. The disclosures of the aforementioned applications are hereby incorporated by reference in their entireties.

TECHNICAL FIELD

This application relates to the communication field, and more specifically, to an initial access method and an apparatus.

BACKGROUND

Development of mobile services poses increasingly high requirements on a data rate and efficiency in wireless communication. A beamforming technology can be used to effectively expand a transmission range of a radio signal, and reduce signal interference, to achieve higher communication efficiency and obtain a higher network capacity. In a communication network using the beamforming technology, to obtain high communication efficiency, a transmit beam is matched with a receive beam, to maximize a gain from a transmitting end to a receiving end. To enable terminals in an entire area to access a communication network, a network device sends, in a beam sweeping manner, a time-division synchronization signal block (SSB) used for initial access, and a terminal device may perform random access based on the detected synchronization signal block.

However, when the time-division synchronization signal block is sent in the beam sweeping manner, system resource overheads increase as a quantity of SSBs sent by the network device increases. Therefore, how to resolve a problem of resource overheads in an initial access process is an urgent problem to be resolved.

SUMMARY

This application provides an initial access method and an apparatus, to resolve a problem of resource overheads in an initial access process.

According to a first aspect, an initial access method is provided, including: detecting M synchronization signal blocks SSBs sent by a network device, where sending time points of the M SSBs are the same, sending frequencies of any two of the M SSBs are different, the M SSBs include N first SSBs, the first SSB is an SSB located in a synchronization raster, and N is a positive integer; and sending a random access signal to the network device based on a frequency domain position of the detected first SSB in the M SSBs or in the N first SSBs.

According to the method provided in this application, a terminal device detects the M synchronization signal blocks SSBs sent by the network device at a same time point and at different frequencies, where the M SSBs include the N first SSBs located in the synchronization raster; and the terminal device sends the random signal to the network device based on the frequency domain position of the detected first SSB in the M SSBs or in the N first SSBs. The network device sends the M SSBs at a same time point and at different frequencies, so that frequency-division frequency domain resources are effectively used, and a waste of time frequency domain resources for sending the SSBs in a time division manner is reduced. The terminal device sends the random access signal based on the frequency domain position of the detected first SSB in the M SSBs or in the N first SSBs, to improve resource utilization efficiency and reduce resource overheads.

It should be noted that "the M SSBs are sent at a same time point and at different frequencies" may be understood as that the M SSBs are sent in a frequency division manner.

With reference to the first aspect, in some implementations of the first aspect, the method further includes: obtaining a first index of the first SSB, where the first index is an index of the first SSB in the M SSBs, or the first index is an index of the first SSB in the N first SSBs; and determining, based on the first index, a time domain position and/or a frequency domain position for sending the random access signal.

Optionally, the first index may include a time domain index and a frequency domain index.

With reference to the first aspect, in some implementations of the first aspect, the obtaining a first index of the first SSB includes: obtaining the first index based on first indication information sent by the network device, where the first indication information is carried in at least one of a synchronization signal SS, a physical broadcast channel PBCH demodulation reference signal DMRS, a PBCH, a reference signal RS, a system message, a data channel, or a control channel.

Optionally, the network device may indicate the frequency domain index and/or the frequency domain index by using the first indication information. For example, the network device may include, in a PBCH DMRS, indication information that indicates the frequency domain index, and include, in data transmitted through a PBCH, indication information that indicates the time domain index.

Optionally, an SSB that is in the M SSBs and that is located in an asynchronous raster may be indicated by using system information or signaling, where the signaling may be signaling carried in the data channel, for example, radio resource control signaling or media access control signaling, or the signaling may be signaling carried in the control channel, for example, downlink control information.

Optionally, frequency domain indexes of the M SSBs may be indicated by using the system information or the signaling.

With reference to the first aspect, in some implementations of the first aspect, N is one, and the detecting M SSBs sent by a network device includes: detecting, at a first frequency domain position, the first SSB sent by the network device, where the first SSB has a highest frequency in the M SSBs, or the first SSB has a lowest frequency in the M SSBs, or the first SSB has a highest frequency index in the M SSBs, or the first SSB has a lowest frequency index in the M SSBs.

Optionally, the first SSB may alternatively be an SSB whose index is a (floor(M/2))$^{th}$ or a (floor(M/2)+1)$^{th}$ SSB in the M SSBs.

With reference to the first aspect, in some implementations of the first aspect, the detecting M SSBs sent by a network device further includes: detecting M−1 second SSBs at a position separated by $m\Delta f_1 + n\Delta f_2$ from the first frequency domain position, where the second SSB is an SSB that is in the M SSBs and that is located in an asynchronous raster, where $\Delta f_1$ represents a first frequency spacing, $\Delta f_2$ represents a second frequency spacing, and m and n are nonnegative integers.

Optionally, values of both m and n may be 0. In this case, the M SSBs are consecutive in frequency domain.

Optionally, a value of m may be 0, and a value of n may not be 0. In this case, the M SSBs are separated by a fixed frequency spacing in frequency domain.

Optionally, values of both m and n may not be 0. In this case, a frequency spacing between two adjacent SSBs in the M SSBs in frequency domain is $\Delta f_1$ or $\Delta f_1 + \Delta f_2$. It may be understood that when neither m nor n is 0, the frequency spacing of the M SSBs may be configured to enable one of the M SSBs to be located in the synchronization raster.

With reference to the first aspect, in some implementations of the first aspect, a spacing between frequency domain positions of two adjacent SSBs in the M SSBs is $\Delta f_3$, and $\Delta f_3$ represents a third frequency spacing.

Optionally, a unit of a frequency domain spacing may be an absolute frequency, a resource unit, or a resource block.

Optionally, the frequency spacing may be configured by the network device, or may be specified in a communication protocol.

With reference to the first aspect, in some implementations of the first aspect, the method further includes: obtaining a quasi-co-location QCL relationship and/or antenna port information of the M SSBs, where the QCL relationship and/or the antenna port information of the M SSBs are/is used to jointly measure a large-scale parameter and/or jointly demodulate data.

With reference to the first aspect, in some implementations of the first aspect, the obtaining a quasi-co-location QCL relationship and/or antenna port information of the M SSBs includes: determining, based on second indication information sent by the network device, that a plurality of SSBs in the M SSBs have the QCL relationship and/or the antenna port information.

Optionally, the second indication information may be indicated by using synchronization information SS, the system message, or the like.

With reference to the first aspect, in some implementations of the first aspect, the N first SSBs do not have the QCL relationship, and the obtaining a quasi-co-location QCL relationship and/or antenna port information of the M SSBs includes: determining, based on third indication information sent by the network device, that a second SSB and a third SSB have the QCL relationship, where the second SSB is one of the SSBs that are of the M SSBs and that are located in the asynchronous raster, the third SSB is one of the N first SSBs that has a first relationship with the second SSB, and the first relationship is an adjacent relationship of a frequency domain position, a frequency domain index, or a frequency value.

With reference to the first aspect, in some implementations of the first aspect, the N first SSBs do not have the QCL relationship, and the obtaining a quasi-co-location QCL relationship and/or antenna port information of the M SSBs includes: determining, according to a specification of the communication protocol, that a second SSB and a third SSB have the QCL relationship, where the second SSB is one of the SSBs that are of the M SSBs and that are located in the asynchronous raster, the third SSB is one of the N first SSBs that has a first relationship with the second SSB, and the first relationship is an adjacent relationship of a frequency domain position, a frequency domain index, or a frequency value.

With reference to the first aspect, in some implementations of the first aspect, the sending, based on a frequency domain position of the detected first SSB in the M SSBs or in the N first SSBs, a random access signal used for initial access, to the network device includes: determining a first random access occasion RO based on the detected first SSB and a first correspondence, where the first correspondence includes a correspondence between the M SSBs and P ROs, and P is a positive integer; and sending the random access signal on the first RO.

With reference to the first aspect, in some implementations of the first aspect, the first correspondence is one of the following relationships: a one-to-one mapping relationship between the M SSBs and the P ROs in a frequency domain-first order, where M=P; a mapping relationship between each of the M SSBs and a plurality of ROs in the P ROs in a frequency domain-first order; a mapping relationship between at least two of the M SSBs and one of the P ROs in a frequency domain-first order; or a mapping relationship between the M SSBs and each of at least one RO, where the at least one RO is at least one of the P ROs.

It should be noted that the frequency domain-first order may be an order of frequencies of the M SSBs.

Optionally, the P ROs have priorities in time domain and/or frequency domain, and the M SSBs may be mapped to the P ROs in the frequency domain-first order.

According to a second aspect, an initial access method is provided, including: sending M synchronization signal blocks SSBs, where sending time points of the M SSBs are the same, sending frequencies of any two of the M SSBs are different, the M SSBs include N first SSBs, the first SSB is an SSB located in a synchronization raster, and N is a positive integer; and receiving a random access signal sent by a terminal device, where the random access signal is sent by the terminal device based on a frequency domain position of the detected first SSB in the M SSBs or in the N first SSBs.

According to the method provided in this application, the network device sends the M SSBs at a same time point and at different frequencies, where the M SSBs include the N first SSBs located in the synchronization raster, so that a resource waste produced when the network device sends the SSB can be reduced, and resource utilization efficiency can be improved.

With reference to the second aspect, in some implementations of the second aspect, the method further includes: a time domain position and/or a frequency domain position of the random access signal are/is determined by the terminal device based on a first index, and the first index is an index of the first SSB in the M SSBs, or the first index is an index of the first SSB in the N first SSBs.

With reference to the second aspect, in some implementations of the second aspect, the method further includes: sending first indication information, where the first indication information is used by the terminal device to obtain the first index, and the first indication information is carried in at least one of a synchronization signal SS, a physical broadcast channel PBCH demodulation reference signal DMRS, a PBCH, a reference signal RS, a system message, a data channel, or a control channel.

With reference to the second aspect, in some implementations of the second aspect, N is one, and the sending M SSBs includes:

sending the first SSB at a first frequency domain position, where the first SSB has a highest frequency in the M SSBs, or the first SSB has a lowest frequency in the M SSBs, or the first SSB has a highest frequency index in the M SSBs, or the first SSB has a lowest frequency index in the M SSBs.

With reference to the second aspect, in some implementations of the second aspect, the sending M SSBs further includes: sending M−1 second SSBs at a frequency domain position separated by $m\Delta f_1+n\Delta f_2$ from the first frequency domain position, where the second SSB is an SSB that is in the M SSBs and that is located in an asynchronous raster, where $\Delta f_1$ represents a first frequency spacing, $\Delta f_2$ represents a second frequency spacing, and m and n are nonnegative integers.

With reference to the second aspect, in some implementations of the second aspect, a spacing between frequency domain positions of two adjacent SSBs in the M SSBs is $\Delta f_3$, and $\Delta f_3$ represents a third frequency spacing.

With reference to the second aspect, in some implementations of the second aspect, the method further includes: sending second indication information, where the second indication information indicates that a plurality of SSBs in the M SSBs have a QCL relationship and/or antenna port information.

With reference to the second aspect, in some implementations of the second aspect, the N first SSBs do not have the QCL relationship, and the method further includes: sending third indication information, where the third indication information indicates that a second SSB and a third SSB have the QCL relationship, the second SSB is one of the SSBs that are of the M SSBs and that are located in the asynchronous raster, the third SSB is one of the N first SSBs that has a first relationship with the second SSB, and the first relationship is an adjacent relationship of a frequency domain position, a frequency domain index, or a frequency value.

With reference to the second aspect, in some implementations of the second aspect, the method further includes: determining, based on a first random access occasion RO and a first correspondence, the first SSB that can be detected by the terminal device, where the first RO is an RO used for receiving the random access signal, the first correspondence includes a correspondence between the M SSBs and P ROs, and P is a positive integer.

With reference to the second aspect, in some implementations of the second aspect, the first correspondence is one of the following relationships: a one-to-one mapping relationship between the M SSBs and the P ROs in a frequency domain-first order, where M=P; a mapping relationship between each of the M SSBs and a plurality of ROs in the P ROs in a frequency domain-first order; a mapping relationship between at least two of the M SSBs and one of the P ROs in a frequency domain-first order; or a mapping relationship between the M SSBs and each of at least one RO, where the at least one RO is at least one of the P ROs.

According to a third aspect, an initial access apparatus is provided, including: a processing unit, configured to detect M synchronization signal blocks SSBs sent by a network device, where sending time points of the M SSBs are the same, sending frequencies of any two of the M SSBs are different, the M SSBs include N first SSBs, the first SSB is an SSB located in a synchronization raster, and N is a positive integer; and a transceiver unit, configured to send a random access signal to the network device based on a frequency domain position of the detected first SSB in the M SSBs or in the N first SSBs.

With reference to the third aspect, in some implementations of the third aspect, the processing unit is further configured to obtain a first index of the first SSB, where the first index is an index of the first SSB in the M SSBs, or the first index is an index of the first SSB in the N first SSBs, and the processing unit is further configured to determine, based on the first index, a time domain position and/or a frequency domain position for sending the random access signal.

With reference to the third aspect, in some implementations of the third aspect, the processing unit is further configured to obtain the first index based on first indication information sent by the network device, where the first indication information is carried in at least one of a synchronization signal SS, a physical broadcast channel PBCH demodulation reference signal DMRS, a PBCH, a reference signal RS, a system message, a data channel, or a control channel.

With reference to the third aspect, in some implementations of the third aspect, N is one, and the processing unit is further configured to detect, at a first frequency domain position, the first SSB sent by the network device, where the first SSB has a highest frequency in the M SSBs, or the first SSB has a lowest frequency in the M SSBs, or the first SSB has a highest frequency index in the M SSBs, or the first SSB has a lowest frequency index in the M SSBs.

With reference to the third aspect, in some implementations of the third aspect, the processing unit is further configured to detect M−1 second SSBs at a position separated by $m\Delta f_1+n\Delta f_2$ from the first frequency domain position, where the second SSB is an SSB that is in the M SSBs and that is located in an asynchronous raster, where $\Delta f_1$ represents a first frequency spacing, $\Delta f_2$ represents a second frequency spacing, and m and n are nonnegative integers.

With reference to the third aspect, in some implementations of the third aspect, a spacing between frequency domain positions of two adjacent SSBs in the M SSBs is $\Delta f_3$, and $\Delta f_3$ represents a third frequency spacing.

With reference to the third aspect, in some implementations of the third aspect, the processing unit is further configured to obtain a quasi-co-location QCL relationship and/or antenna port information of the M SSBs, where the QCL relationship and/or the antenna port information of the M SSBs are/is used to jointly measure a large-scale parameter and/or jointly demodulate data.

With reference to the third aspect, in some implementations of the third aspect, the processing unit is further configured to determine, based on second indication information sent by the network device, that a plurality of SSBs in the M SSBs have the QCL relationship and/or the antenna port information.

With reference to the third aspect, in some implementations of the third aspect, the N first SSBs do not have the QCL relationship, and the processing unit is further configured to determine, based on third indication information sent by the network device, that a second SSB and a third SSB have the QCL relationship, where the second SSB is one of the SSBs that are of the M SSBs and that are located in an asynchronous raster, the third SSB is one of the N first SSBs that has a first relationship with the second SSB, and the first relationship is an adjacent relationship of a frequency domain position, a frequency domain index, or a frequency value.

With reference to the third aspect, in some implementations of the third aspect, the processing unit is further configured to determine a first random access occasion RO based on the detected first SSB and a first correspondence, where the first correspondence includes a correspondence between the M SSBs and P ROs, and P is a positive integer; and the transceiver unit is further configured to send the random access signal on the first RO.

With reference to the third aspect, in some implementations of the third aspect, the first correspondence is one of the following relationships: a one-to-one mapping relationship between the M SSBs and the P ROs in a frequency domain-first order, where M=P; a mapping relationship between each of the M SSBs and a plurality of ROs in the P ROs in a frequency domain-first order; a mapping relationship between at least two of the M SSBs and one of the P ROs in a frequency domain-first order; or a mapping relationship between the M SSBs and each of at least one RO, where the at least one RO is at least one of the P ROs.

According to a fourth aspect, an initial access apparatus is provided, including a transceiver unit and a processing unit, where the transceiver unit is configured to send M synchronization signal blocks SSBs, where sending time points of the M SSBs are the same, sending frequencies of any two of the M SSBs are different, the M SSBs include N first SSBs, the first SSB is an SSB located in a synchronization raster, and N is a positive integer; and the transceiver unit is further configured to receive a random access signal sent by a terminal device, where the random access signal is sent by the terminal device based on a frequency domain position of the detected first SSB in the M SSBs or in the N first SSBs.

With reference to the fourth aspect, in some implementations of the fourth aspect, the processing unit is configured to determine a first index based on a time domain position and/or a frequency domain position of the random access signal, where the first index is an index of the first SSB in the M SSBs, or the first index is an index of the first SSB in the N first SSBs.

With reference to the fourth aspect, in some implementations of the fourth aspect, the transceiver unit is further configured to send first indication information, where the first indication information indicates the terminal device to obtain the first index, where the first indication information is carried in at least one of a synchronization signal SS, a physical broadcast channel PBCH demodulation reference signal DMRS, a PBCH, a reference signal RS, a system message, a data channel, or a control channel.

With reference to the fourth aspect, in some implementations of the fourth aspect, N is one, and the transceiver unit is further configured to send the first SSB at a first frequency domain position, where the first SSB has a highest frequency in the M SSBs, or the first SSB has a lowest frequency in the M SSBs, or the first SSB has a highest frequency index in the M SSBs, or the first SSB has a lowest frequency index in the M SSBs.

With reference to the fourth aspect, in some implementations of the fourth aspect, the transceiver unit is further configured to send M−1 second SSBs at a frequency domain position separated by $m\Delta f_1 + n\Delta f_2$ from the first frequency domain position, where the second SSB is an SSB that is in the M SSBs and that is located in an asynchronous raster, where represents a first frequency spacing, $\Delta f_2$ represents a second frequency spacing, and m and n are nonnegative integers.

With reference to the fourth aspect, in some implementations of the fourth aspect, a spacing between frequency domain positions of two adjacent SSBs in the M SSBs is $\Delta f_3$, and $\Delta f_3$ represents a third frequency spacing.

With reference to the fourth aspect, in some implementations of the fourth aspect, the transceiver unit is further configured to send second indication information, where the second indication information indicates that a plurality of SSBs in the M SSBs have a QCL relationship and/or antenna port information.

With reference to the fourth aspect, in some implementations of the fourth aspect, the N first SSBs do not have the QCL relationship, and the transceiver unit is further configured to send third indication information, where the third indication information indicates that a second SSB and a third SSB have the QCL relationship, the second SSB is one of the SSBs that are of the M SSBs and that are located in the asynchronous raster, the third SSB is one of the N first SSBs that has a first relationship with the second SSB, and the first relationship is an adjacent relationship of a frequency domain position, a frequency domain index, or a frequency value.

With reference to the fourth aspect, in some implementations of the fourth aspect, the processing unit is further configured to determine, based on a first random access occasion RO and a first correspondence, the first SSB that can be detected by the terminal device, where the first RO is an RO used for receiving the random access signal, the first correspondence includes a correspondence between the M SSBs and P ROs, and P is a positive integer.

With reference to the fourth aspect, in some implementations of the fourth aspect, the first correspondence is one of the following relationships: a one-to-one mapping relationship between the M SSBs and the P ROs in a frequency domain-first order, where M=P; a mapping relationship between each of the M SSBs and a plurality of ROs in the P ROs in a frequency domain-first order; a mapping relationship between at least two of the M SSBs and one of the P ROs in a frequency domain-first order; or a mapping relationship between the M SSBs and each of at least one RO, where the at least one RO is at least one of the P ROs.

According to a fifth aspect, a communication apparatus is provided, including a module or unit configured to perform the method in any one of the first aspect or the possible implementations of the first aspect, or a module or unit configured to perform the method in any one of the second aspect or the possible implementations of the second aspect. The module or unit may be implemented by a hardware circuit, software, or a combination of the hardware circuit and the software.

According to a sixth aspect, a communication apparatus is provided, including a processor and a memory, where the memory stores a program or instructions, and the processor is configured to invoke the instructions from the memory and execute the instructions, to enable the apparatus to perform the method in any one of the first aspect or the possible implementations of the first aspect, or perform the method in any one of the second aspect or the possible implementations of the second aspect.

Optionally, the apparatus further includes a transceiver.

Optionally, the processor is coupled to the memory.

According to a seventh aspect, a communication apparatus is provided. The apparatus includes at least one processor and a communication interface, where the communication interface is configured for the apparatus to exchange information with another apparatus, and when program instructions are executed in the at least one processor, the apparatus is enabled to perform the method in any one of the first aspect or the possible implementations of the first aspect, or perform the method in any one of the second aspect or the possible implementations of the second aspect.

Optionally, the communication interface may be a transceiver, a circuit, a bus, a module, a pin, or a communication interface of another type.

Optionally, the apparatus further includes a memory. The memory is configured to store instructions and data. When executing the instructions stored in the memory, the processor may implement the method in any one of the first aspect or the possible implementations of the first aspect, or perform the method in any one of the second aspect or the possible implementations of the second aspect.

According to an eighth aspect, a computer-readable storage medium is provided. The computer-readable storage medium stores a computer program. When the computer program is run on a computer, the computer is enabled to perform the method in any one of the first aspect or the possible implementations of the first aspect, or perform the method in any one of the second aspect or the possible implementations of the second aspect.

According to a ninth aspect, a computer program product including instructions is provided. When the computer program product runs on a computer, the computer is enabled to perform the method in any one of the first aspect or the possible implementations of the first aspect, or perform the method in any one of the second aspect or the possible implementations of the second aspect.

According to a tenth aspect, a communication system is provided, including the communication apparatuses according to the third aspect and the fourth aspect, or the communication apparatuses according to the fifth aspect, the sixth aspect, and the seventh aspect.

DESCRIPTION OF EMBODIMENTS

Figure 1:
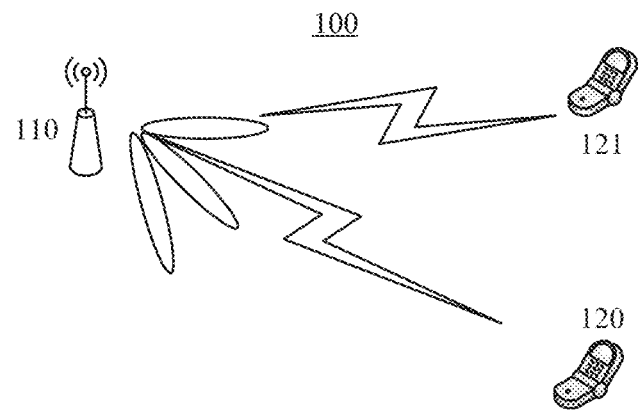
FIG. 1 is a schematic diagram of a wireless communication system according to an embodiment of this application.

The following describes technical solutions of this application with reference to accompanying drawings:

Embodiments of this application may be applied to various communication systems, for example, a long term evolution (LTE) system, an advanced long term evolution, (LTE-A) system, an LTE frequency division duplex (FDD) system, an LTE time division duplex (TDD) system, a universal mobile telecommunication system (UMTS), a worldwide interoperability for microwave access (WiMAX) communication system, a wireless local area network (WLAN), a wireless fidelity (Wi-Fi), a future 5th generation (5G) system, or a new radio (NR), or a next-generation communication system. This is not limited in embodiments of this application.

Usually, a connection quantity supported by a conventional communication system is limited, and is easy to implement. However, with development of communication technologies, a mobile communication system not only supports conventional communication, but also supports device-to-device (D2D) communication, machine-to-machine (M2M) communication, machine type communication (MTC), vehicle-to-vehicle (V2V) communication, and the like.

In embodiments of this application, embodiments are described with reference to a network device and a terminal device.

The terminal device may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device may be a station (ST) in a WLAN, or may be a mobile phone, a satellite phone, a cellular phone, a cordless phone, a session initiation protocol (SIP) phone, a tablet computer (pad), a computer having a wireless transceiver function, a wireless local loop (WLL) station, a personal digital assistant (PDA) device, a virtual reality (VR) terminal device, an augmented reality (AR) terminal device, a wireless terminal in industrial control, self driving, telemedicine (remote medical), a smart grid, transportation security, a smart city, a smart home, a terminal device in a 5G network or a future evolved public land mobile network (PLMN), a handheld device or a computing device having a wireless communication function or another processing device connected to a wireless modem, a vehicle-mounted device, a wearable device connected, and a next-generation communication system, for example, a terminal device in a fifth-generation communication (5G) network or a terminal device in a future evolved public land mobile network (PLMN). An application scenario is not limited in embodiments of this application.

By way of example, and not limitation, in embodiments of this application, the terminal device may alternatively be a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that can be directly worn or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application function and need to work with other devices such as smartphones, such as various smart bands or smart jewelry for monitoring physical signs.

The network device may be any device having a wireless transceiver function. The network device includes but is not limited to: an evolved NodeB (eNB or eNodeB), a radio network controller (RNC), a NodeB (NB), a base station controller (BSC), a base transceiver station (BTS), a home NodeB (for example, home evolved NodeB, or home NodeB, HNB), a baseband unit (BBU), an access point in a WLAN, an access point (AP) in a wireless fidelity (Wi-Fi) system, a wireless relay node, and a wireless backhaul node, a transmission point (TP), a transmission reception point (TRP), or the like. Alternatively, the network device may be a gNB or a transmission point (TRP or TP) in a 5G, for example, NR, system, one antenna panel or a group of antenna panels (including a plurality of antenna panels) of a base station in the 5G system, a network node, for example, a baseband unit (BBU) or a distributed unit (DU), that constitutes the gNB or the transmission point, a device that functions as a base station in device-to-device (D2D), vehicle-to-everything (V2X), or machine-to-machine (M2M) communication, a vehicle-mounted device, a wearable device, a network device in a future 5G network, a network device in a future evolved PLMN network, or the like. This is not limited in embodiments of this application.

A wireless communication method in embodiments of this application may be applied to a system including one or more network devices and one or more terminal devices.

For example, FIG. 1 is a schematic diagram of a possible wireless communication system according to an embodiment of this application. As shown in FIG. 1, the communication system 100 includes a network device and terminal devices, for example, a network device 110, a terminal device 120, and a terminal device 121 shown in FIG. 1. In the communication system, the network device communicates with the terminal device in a beam sweeping manner. In the communication system shown in FIG. 1, one network device may transmit data or control signaling to one or more terminal devices.

Figure 2:
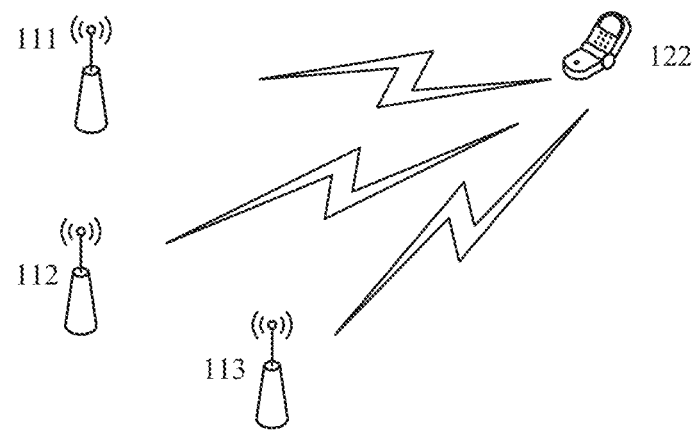
FIG. 2 is a schematic diagram of another wireless communication system according to an embodiment of this application.

For another example, FIG. 2 is a schematic diagram of another possible wireless communication system according to an embodiment of this application. In the communication system shown in FIG. 2, a plurality of network devices (for example, network devices 111, 112, and 113) may simultaneously transmit data or control signaling to one terminal device (for example, a terminal device 122).

For ease of description, the following describes related concepts in embodiments of this application:

Synchronization signal (SS): The synchronization signal is used to implement time-frequency synchronization between a terminal and a network side and detect a cell physical identifier (ID). The synchronization signal includes a primary synchronization signal (PSS) and/or a secondary synchronization signal (SSS). The PSS is used by the terminal device to perform time-frequency synchronization and detect a cell. The SSS is used to transmit the cell physical identifier ID. Alternatively, the PSS and the SSS may be combined to implement the foregoing functions.

Physical broadcast channel (PBCH): The physical broadcast channel is used to transmit primary system information, for example, a small amount of important information and a method for obtaining other system information.

Synchronization signal/physical broadcast channel (SSB): The synchronization signal/physical broadcast channel is referred to as a synchronization signal block, includes a synchronization signal SS and/or a PBCH, and is used to implement time synchronization, detect a cell physical identifier (ID), obtain primary system information, and the like.

Reference signal and physical channel: At a physical layer, uplink communication includes transmission of an uplink physical channel and an uplink signal. The uplink physical channel includes a random access channel (PRACH), an uplink control channel (PUCCH), an uplink data channel (PUSCH), and the like. The uplink signal includes a channel sounding reference signal (SRS), an uplink control channel demodulation reference signal (PUCCH-DMRS), an uplink data channel demodulation reference signal (PUSCH-DMRS), an uplink phase noise tracking signal (PTRS), an uplink positioning signal (RS), and the like. Downlink communication includes transmission of a physical downlink channel and a downlink signal. The physical downlink channel includes a broadcast channel PBCH, a downlink control channel (PDCCH), a downlink data channel (PDSCH), and the like. The downlink signal includes a primary synchronization signal PSS/secondary synchronization signal SSS, a downlink control channel demodulation reference signal PDCCH-DMRS, a downlink data channel demodulation reference signal PDSCH-DMRS, a phase noise tracking signal (PTRS), a channel state information reference signal (CSI-RS), a cell signal (CRS), and a fine synchronization signal (TRS), an LTE/NR positioning signal (positioning RS), and the like.

Antenna port: in a case of a low frequency, one antenna port may correspond to one or more antenna array elements. The antenna array element is configured to jointly send a reference signal, and the terminal device may receive the reference signal without distinguishing between array elements. In a case of a high frequency, an antenna port may correspond to one beam.

Beam: The beam may be a wide beam, a narrow beam, or a beam of another type. A technology for forming the beam may be a beamforming technology or another technical means. The beamforming technology may include a digital beamforming technology, an analog beamforming technology, or a hybrid digital/analog beamforming technology. Same information or different information may be sent through different beams. Optionally, a plurality of beams having the same communication feature or similar communication features may be considered as one beam. The beam may include one or more antenna ports, configured to transmit a data channel, a control channel, a sounding signal, and the like. For example, a transmit beam may be signal strength distribution formed in different directions in space after a signal is transmitted through an antenna, and a receive beam may be signal strength distribution, in different directions in space, of a radio signal received from an antenna. It may be understood that the one or more antenna ports forming the beam may alternatively be considered as one antenna port set. The beam may further be embodied as a spatial filter.

Particularly, there are two different concepts: a digital weight (used to generate a digital beam) and an analog weight (used to generate an analog beam). The digital weight is weighted in a digital domain, and the weight may be any value (theoretically). The analog weight is weighted in an analog domain, and most commonly, a signal is weighted by using a phase shifter (or a signal is weighted by using a delay line). A hybrid digital/analog beam, in combination with the digital weight and the analog weight, are weighted in the digital domain and the analog domain respectively.

Quasi-co-location (QCL): Quasi-co-location may also be referred to as quasi co-location. A co-location relationship represents that a plurality of resources have one or more same or similar communication features. For the plurality of resources that have the co-location relationship, same or similar communication configurations may be used. For example, if two antenna ports have a co-location relationship, a large-scale channel property in which one port transmits a symbol may be inferred from a large-scale channel property in which the other port transmits a symbol. Large-scale properties may include delay spread, an average delay, Doppler spread, a Doppler frequency shift, an average gain, a receiving parameter, a receive beam number of a terminal device, transmitting/receiving channel correlation, a receiving angle of arrival, spatial correlation (a spatial QCL) of a receiver antenna, a dominant angle of arrival (AoA), an average angle of arrival, AoA spread, and the like.

Spatial quasi-co-location: The spatial QCL may be considered as a type of QCL. From a perspective of a receiving end, if two antenna ports, two signals, or two channels are spatially quasi-co-located, it means that the receiving end can receive, in a same beam direction, signals sent by the two antenna ports, or receive the two signals, or receive signals sent through the two channels.

Quasi-co-location assumption: The quasi-co-location assumption means assuming whether there is a QCL relationship between two ports. A configuration and an indication of the quasi-co-location assumption may be used to help a receiving end receive and demodulate a signal. For example, the receiving end can determine that there is a large-scale QCL relationship between a port A and a port B. To be specific, the receiving end may use a large-scale parameter of a signal measured on the port A for signal measurement and demodulation on the port B, may jointly measure a same large-scale parameter by using received signals of the two ports, or the like.

It should be noted that if there is no large-scale QCL relationship between SSBs, ports for sending the SSBs do not belong to a same port. If the two ports are the same port, the two ports must have all large-scale QCL relationships.

Radio resource control (RRC): Radio resources are managed, controlled, and scheduled by using specific policies and methods. With quality of service requirements met, limited radio network resources are fully utilized to ensure that planned coverage area is reached and service capacity and resource utilization are improved.

Media access control (MAC) layer: The media access control layer is located between an RRC layer and a physical layer and mainly responsible for controlling transmission at the physical layer.

Synchronization raster: The synchronization raster is used to send a synchronization signal. When accessing a cell, a terminal searches on the synchronization raster in a frequency domain dimension.

Figure 3:
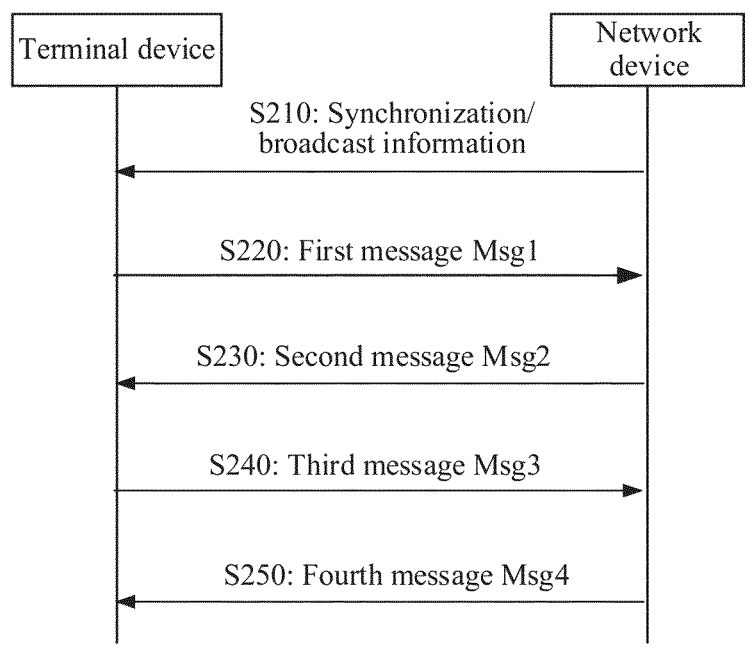
FIG. 3 is a schematic interaction diagram of a wireless communication method.

FIG. 3 is a schematic interaction diagram of a possible wireless communication method. For example, the wireless communication method is an interaction process of a method for performing an initial access process between a network device and a terminal device. The terminal device needs to establish a radio link to the network device and exchange data with the network device via random access to complete uplink access. As shown in FIG. 3, the wireless communication method 200 may be applied to the communication systems shown in FIG. 1 and FIG. 2. The method 200 includes the following steps:

S210: The network device sends synchronization/broadcast information to the terminal device.

The network device periodically sends a broadcast/synchronization message at a specific position. The broadcast/synchronization message may include a synchronization signal block SSB, a system message, and the like. The system message may be the broadcast message, and the system message may be sent through a same beam used for sending the SSB.

S220: The terminal device sends a first message (Msg1) to the network.

After being powered on, the terminal device scans the broadcast/synchronization message sent by the network device, to perform synchronization of downlink time and synchronization of downlink frequency, and simultaneously receive random access resource-related configuration information in the broadcast message.

It should be noted that the terminal device receives the synchronization/broadcast information sent by the network device, and sends the first message to the network device based on the synchronization/broadcast information.

The terminal device receives the random resource configuration information, and determines random access resources based on a detected SSB. The random access resources include a time domain resource, a frequency domain resource, and a sequence resource, and therefore, the terminal device may send a random access signal (namely, the first message) by using the random access resource. A random access occasion (RO) includes a random access time resource and a random access frequency resource.

The terminal device selects a physical random access channel (PRACH) time-frequency resource (PRACH occasion, PO) to transmit the first message (namely, the Msg1).

It should be noted that a 5G NR system supports beamforming by default, and a random access process in this mode is a beam-based access process. During downlink synchronization, the terminal device needs to receive and detect a synchronization signal block index having a strongest or stronger signal, determine a downlink beam, and obtain an available PRACH time-frequency resource and a preamble sequence set based on a correspondence between an SSB index indicated by the system message (synchronization signal block, SIB) and the PRACH time-frequency resource.

S230: The network device returns a second message Msg2 to the terminal device.

The network device receives the first message sent by the terminal device, and sends a random access response (RAR) (namely, the second message) to the terminal device. A random access response signal includes a physical downlink shared channel (PDSCH) and a physical downlink control channel (PDCCH), and the PDCCH is used to schedule the PDSCH. The PDSCH includes configuration information such as a time-frequency resource position and a modulation and coding scheme that are used by the terminal device to send a third message to resolve a conflict.

S240: The terminal device sends the third message Msg3 to the network device.

The terminal device obtains, based on the received second message, the configuration information in the second message, and selects a time-frequency resource to send the third message.

S250: The network device sends a fourth message Msg4 to the terminal device.

The fourth message indicates that the terminal device access succeeds.

Figure 4:
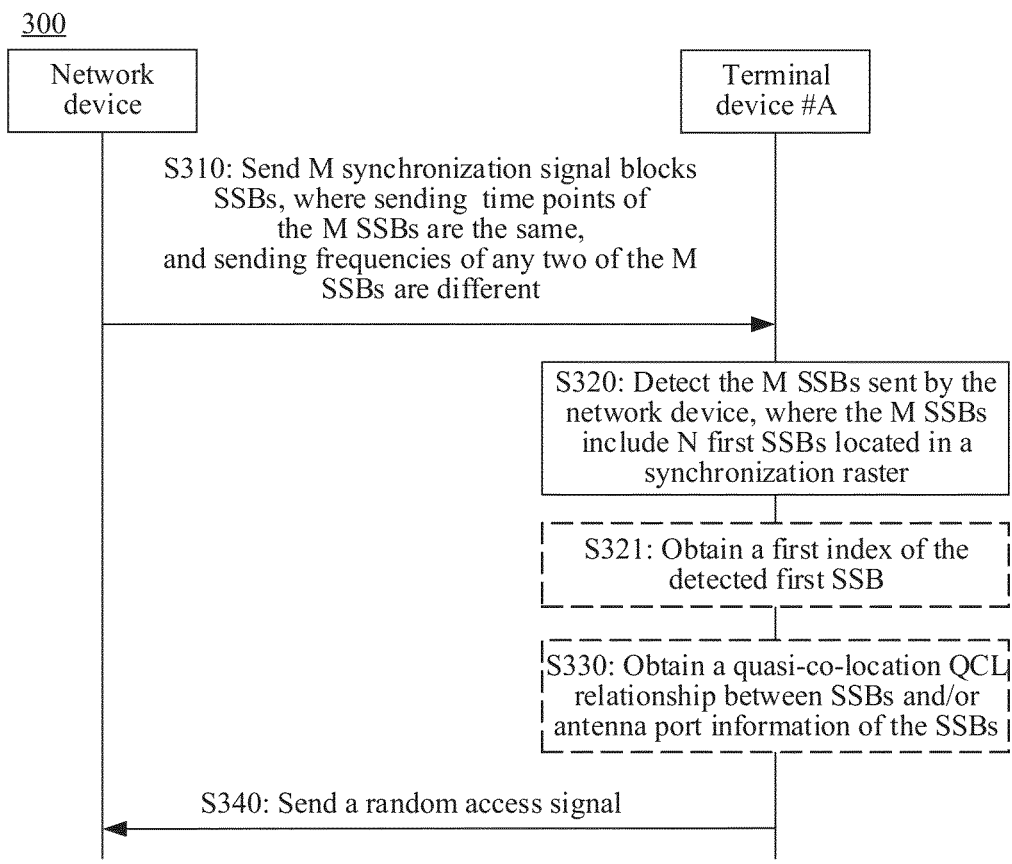
FIG. 4 is another schematic flowchart of a wireless communication method according to an embodiment of this application.

FIG. 4 is a schematic interaction diagram of a wireless communication method according to an embodiment of this application. As shown in FIG. 4, the method 300 may be applied to the communication systems shown in FIG. 1 or FIG. 2, and the method 300 includes the following steps:

S310: A network device sends M synchronization signal blocks SSBs to a terminal device #A (to be specific, an example of a terminal device). Sending time points of the M SSBs are the same, and sending frequencies of any two of the M SSBs are different. The M SSBs include N first SSBs, the N first SSBs are SSBs located in a synchronization raster, and N is a positive integer.

Optionally, the network device may send the M SSBs at a same time point and at different frequencies (which may be referred to as sending the M SSBs in a frequency division manner). Compared with a manner in which a plurality of SSBs are sent only in time domain, more time domain resources can be saved by sending a frequency-division SSB, to greatly reduce resource overheads.

For example, the network device forms different digital beams or digital-analog beams at different frequencies, and separately sends the plurality of SSBs through different digital beams or analog beams.

For another example, the network device may send the SSB at different frequencies through different analog beams. The analog beam may be generated by different combinations of shifters using different analog weights.

Optionally, the M SSBs sent by the network device include a quantity of SSBs required by the terminal device #A to complete initial access. For example, when the network device transmits 16 different SSBs in a one-to-one correspondence through 16 different beams to implement a function such as terminal initial synchronization, the network device may choose to send four frequency-division SSBs in the synchronization raster. Correspondingly, four SSBs are sent in time domain in a time division manner.

The network device sends, only in the synchronization raster, a quantity of SSBs required by the terminal device to implement the function such as initial synchronization, and the terminal device may synchronize with any SSB, to reduce resource overheads.

Optionally, the network device may choose to send the M SSBs in the synchronization raster and an asynchronous raster. For example, when the network device transmits 16 different SSBs in a one-to-one correspondence through 16 different beams to implement a function such as terminal initial synchronization, the network device may choose to send four SSBs in a frequency division manner (to be specific, four SSBs are sent at a same time point and at different frequencies), where two SSBs are sent in the synchronization raster. Correspondingly, eight SSBs are sent in time domain in a time division manner.

Figure 5:
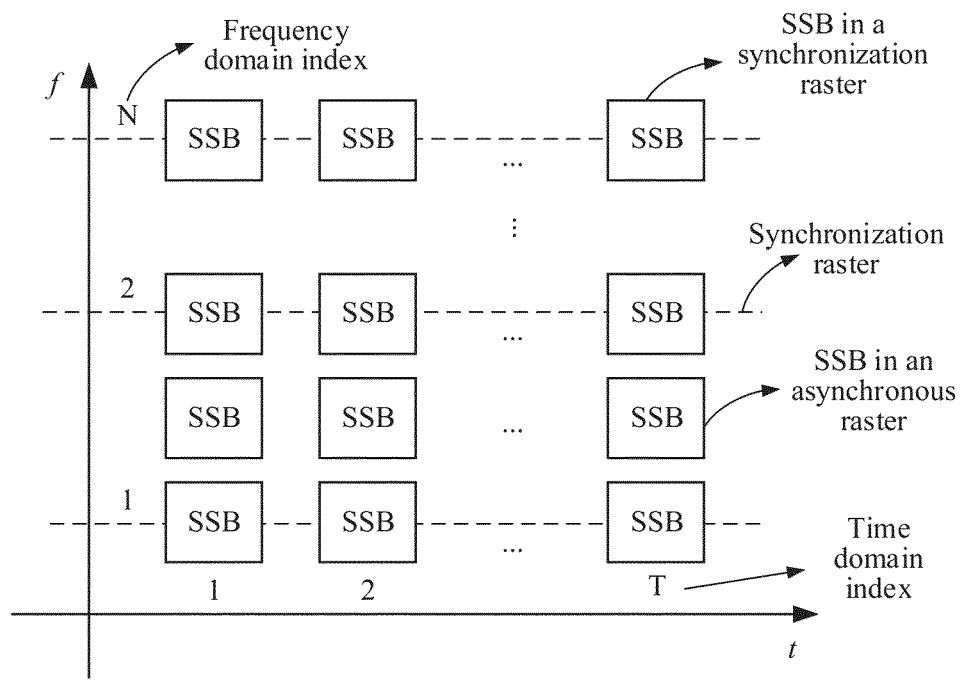
FIG. 5 is a schematic diagram of positions of synchronization signal blocks according to an embodiment of this application.

FIG. 5 is a schematic diagram of positions of synchronization signal blocks according to an embodiment of this application. As shown in FIG. 5, some SSBs sent by a network device are located in synchronization rasters, and some SSBs are located in an asynchronous raster. Dashed lines indicate positions of the synchronization rasters in frequency domain. To be specific, an SSB having an index number in SSBs in the frequency domain is located in the synchronization rasters.

The network device selects to send frequency-division SSBs in the synchronization raster and the asynchronous raster, so that frequency domain positions of the SSBs are not restricted by the synchronization raster. Therefore, the frequency-division SSBs have flexible positions.

Optionally, one of frequency-division SSBs (to be specific, the SSBs sent at a same time point) in M SSBs sent by the network device is located in the synchronization raster (that is, N is one). For example, an SSB #0 in the M SSBs sent by the network device is located in the synchronization raster. The SSB #0 is an SSB sent at a frequency domain position #0.

When only one frequency-division SSB is located in the synchronization raster, the SSB that is located in the synchronization raster and that is sent by the network device may be an SSB having a maximum frequency index or a highest frequency, an SSB having a minimum frequency index or a lowest frequency, or an intermediate SSB (for example, a (floor(M/2))$^{th}$ or a (floor(M/2)+1)$^{th}$ SSB, where M is a quantity of SSBs that are divided by frequencies at a same moment). By restricting the position of the SSB located in the synchronization raster, the terminal is enabled to directly learn of a frequency domain index of the SSB when detecting the SSB. Particularly, when restricting the SSB that has the maximum index and that is located in the synchronization raster, a terminal device may directly learn of a quantity of SSBs sent by the network device.

Optionally, the network device sends the SSB #0 at the frequency domain position #0, and sends M−1 SSBs (namely, second SSBs, such as an SSB #1, an SSB #2, ..., and an SSB #(M−1)) located in the asynchronous raster at a frequency domain position separated by $m\Delta f_1 + n\Delta f_2$ from the frequency domain position #0. $\Delta f_1$ represents a first frequency spacing, $\Delta f_2$ represents a second frequency spacing, and m and n are nonnegative integers. In a possible implementation solution, only one SSB in the M frequency-division SSBs is located in the synchronization raster, and in $m\Delta f_1 + n\Delta f_2$, values of m and n are 0. In other words, the M frequency-division SSBs are consecutively placed in a frequency domain resource.

In a possible implementation solution, only one SSB in the M frequency-division SSBs is located in the synchronization raster, and in $m\Delta f_1 + n\Delta f_2$, a value of n is 0 and a value of m is not 0. To be specific, the M frequency-division SSBs are placed in the frequency domain resource at a spacing of a fixed frequency range $\Delta f_1$. For example, the SSB #0 is an SSB located in the synchronization raster, the SSB #0 is located at the frequency domain position #0, and the SSB #0 corresponds to a highest frequency or a lowest frequency. The SSB #1 is placed at a spacing of $\Delta f_1$ from the frequency domain position #0, the SSB #2 is placed at a spacing of $2\Delta f_1$ from the frequency domain position #0, ..., and the SSB #(M−1) is placed at a spacing of $(M−1)\Delta f_1$ from the frequency domain position #0.

For another example, the SSB #0 is located at the frequency domain position #0, and the SSBs located in the asynchronous raster are located on two sides of the position of the SSB #0. For example, the SSB #1 and the SSB #2 are placed at a spacing of $\Delta f_1$ from the frequency domain position #0, and an SSB #3 and an SSB #4 are placed at a spacing of $2\Delta f_1$ from the frequency domain position #0.

In a possible implementation solution, only one SSB (SSB #0) of the M frequency-division SSBs is located in the synchronization raster, and in $m\Delta f_1 + n\Delta f_2$, values of m and n are not 0. To be specific, a manner in which a plurality of frequency-division SSBs are placed consecutively or placed at a spacing of $\Delta f1$. If another SSB other than the SSB #0 is located in the synchronization raster, the SSB is placed at an additional spacing of a specific frequency range $\Delta f_2$, to ensure that only the SSB #0 is located in the synchronization raster.

Optionally, the frequency ranges $\Delta f1$, and $\Delta f2$ of the spacing each may be an absolute frequency Hz, a resource element (RE), a resource block (RB) granularity, or the like. A subcarrier width referenced by the RE and the RB is a width of a subcarrier of the SSB or a fixed subcarrier.

Optionally, the frequency-division SSBs are consecutively placed in the frequency domain or spaced at a fixed spacing of a frequency ranges $\Delta f3$, and it is ensured that at least one SSB in the frequency domain is located in the synchronization raster. The frequency range $\Delta f_1$ of the spacing may be an absolute frequency Hz, an RE, an RB granularity, or the like. A subcarrier width referenced by the RE and the RB is a width of a subcarrier of the SSB or a fixed subcarrier.

Optionally, the frequency ranges $\Delta f1$, $\Delta f2$, and $\Delta f3$ may be configured by a network side, or agreed in a communication protocol.

It should be noted that when an initial access SSB is sent in a frequency division manner, the network device needs to restore a frequency composition manner. For example, the network device stores the frequency composition manner in a memory.

Optionally, the network device may send the synchronization signal block to the terminal device in a broadcast manner.

S320: The terminal device #A detects the M synchronization signal blocks SSBs sent by the network device. The M SSBs include N first SSBs that are located in the synchronization raster.

It should be noted that the terminal device #A detects the M SSBs sent by the network device. The M SSBs are sent at a same sending time point and at different sending frequencies. The M SSBs include the N first SSBs, the first SSB is an SSB located in the synchronization raster, and N is a positive integer.

It should be understood that the terminal device #A receives the synchronization signal block SSB sent by the network device, and detects a frequency domain synchronization signal block SSB and a time-frequency domain index of the SSB.

The network device sends the M SSBs through different beams, and the terminal device #A detects the M SSBs sent by the network device. It should be noted that the terminal device #A may detect an SSB sent by a beam covering the terminal device #A.

It should be understood that the network device may choose to send the synchronization signal block only in the synchronization raster, or send the synchronization signal block in the synchronization raster and the asynchronous raster. In an initial access process, the terminal device #A searches for a synchronization signal in the synchronization raster to perform initial access.

Optionally, after the terminal device #A detects the M synchronization signal blocks sent by the network device in the synchronization raster, the method 300 further includes the following steps:

S321: The terminal device #A obtains a first index of the detected first SSB.

The terminal device #A may obtain the first index of the first SSB based on the detected first SSB. The first index is an index of the first SSB in the M SSBs, or the first index is an index of the first SSB in the N first SSBs.

It should be noted that the obtained first index is the index of the first SSB in the M SSBs or the index of the first SSB in the N first SSBs may be determined based on a correspondence that is between indication information and an SSB index and that is stored in the terminal device. In other words, the terminal device prestored the correspondence between the indication information and the SSB index.

Optionally, after obtaining the first index, the terminal device #A may determine, based on the first index, a time domain position and/or a frequency domain position for sending a random access signal to the network device.

Optionally, the first index is a time domain index and/or a frequency domain index of the first SSB. For example, in FIG. 5, each SSB corresponds to one time domain index and one frequency domain index. The terminal device #A may learn of, based on the indexes, a position of the detected SSB in time domain and frequency domain, and therefore, the device may implement initial synchronization with the network device based on the first index.

Figure 6:
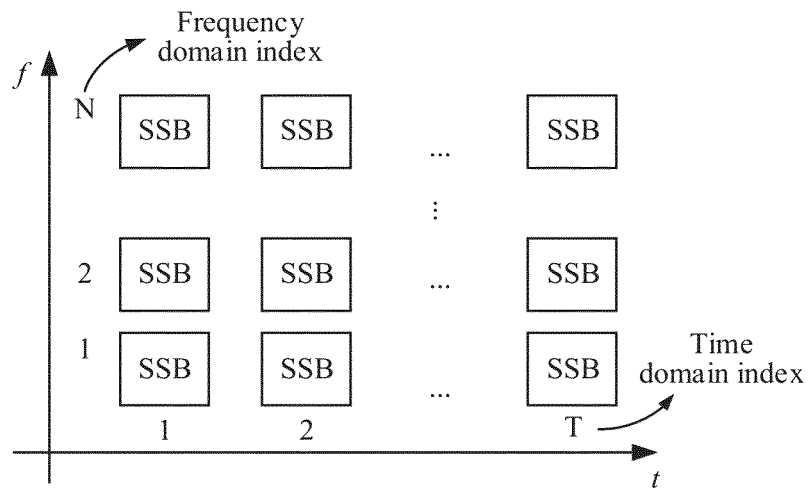
FIG. 6 is another schematic diagram of positions of synchronization signal blocks according to an embodiment of this application.

Optionally, the frequency-division SSB indexing manner may be indexing only the SSB in the synchronization raster, or indexing SSBs in the synchronization raster and the asynchronous raster. FIG. 5 shows a case in which the SSBs in the synchronization raster are indexed according to this embodiment of this application. FIG. 6 is a schematic diagram of positions of synchronization signal blocks according to an embodiment of this application. In FIG. 6, all SSBs are indexed in frequency domain. As shown in FIG. 6, a vertical axis represents frequency-division indexes of SSBs and corresponding frequency domain positions of the SSBs, and a horizontal axis corresponds to time domain indexes of the SSBs and corresponding time domain positions of the SSBs.

Optionally, a terminal device #A obtains a first index based on indication information #A. The indication information #A is carried in at least one of a synchronization signal SS, a physical broadcast channel PBCH demodulation reference signal DMRS, a PBCH, a reference signal RS, a system message, a data channel, or a control channel.

Optionally, the terminal device #A may include the indication information #A by using information in a first SSB. Specifically, index information may be carried in at least one of a synchronization signal SS, a physical broadcast channel demodulation reference signal PBCH DMRS, and primary system information of a physical broadcast channel PBCH in the first SSB.

The first index is obtained based on the indication information #A. For example, frequency domain indexes of SSBs may be carried by using different SS sequences. For another example, frequency domain indexes of SSBs are carried by using positions of different signals in the SS. The terminal device #A may learn of the SSB indexes or some of the SSB indexes during synchronization.

For another example, frequency domain indexes of SSBs are carried by using different DMRS sequences of the PBCH. When demodulating corresponding signals, the terminal device #A may learn of the SSB indexes or some of the SSB indexes.

For another example, frequency domain indexes of SSBs are carried by using the primary system information transmitted in the PBCH. When demodulating corresponding signals, the terminal device #A may learn of the SSB indexes or some of the SSB indexes.

Optionally, the terminal device #A may further obtain the first index based on indication information sent by a network device. Specifically, indication information corresponding to the first SSB may be carried by using at least one of a reference signal RS, system information, and a signaling indication sent by the network device, and index information is obtained based on the indication information.

For example, the network device may send, to the terminal device #A, a reference signal RS that carries a frequency domain index of an SSB, to indicate the frequency domain index of the SSB. For example, frequency domain indexes of SSBs may be carried by using different RS sequences.

For another example, the network device may further indicate a frequency domain index to the terminal device #A by using primary system information transmitted in a non-PBCH or by using a signaling indication.

For another example, a frequency domain index of an SSB may be indicated by using signaling (for example, RRC signaling or MAC signaling) carried on the data channel or signaling (for example, DCI signaling) carried on the control channel.

A wide index range may be indicated by using the reference signal RS, or system information or signaling transmitted in the data channel. In addition, a new RS may be used for independent indication.

Optionally, the network device may jointly include an SSB index in a combination of the foregoing different manners. For example, an SSB index is carried in a combination of different manners in first information, different manners in second information, and different manners in the first information and the second information. For example, two bits are required for an SSB frequency domain index indication, and 1-bit indication information is separately carried in the PBCH DMRS and data transmitted in the PBCH.

Optionally, the network device may jointly include a frequency domain index and a time domain index of an SSB in the foregoing different manners or a combination of the foregoing different manners. For example, the PBCH DMRS is used to carry a frequency domain index, and the data transmitted in the PBCH is used to carry a time domain index; or the PBCH DMRS is used to carry a time domain index, and the data transmitted in the PBCH carries a frequency domain index. For another example, the PBCH DMRS carries time domain indexes and some of frequency domain indexes, and the data transmitted in the PBCH carries some of the frequency domain indexes; or the PBCH DMRS carries some of time domain indexes and frequency domain indexes, and the data transmitted in the PBCH carries some of the time domain indexes. For another example, the network device sends a reference signal RS to the terminal device #A, and includes both time domain indexes and frequency domain indexes by using different RS sequences. It should be noted that, in a jointly designed indication manner, advantages and disadvantages of various indication manners can be considered, and demodulation performance of the terminal is improved.

Optionally, a frequency domain index of an SSB in an asynchronous raster may be indicated by using the system information or another signaling indication method.

It should be noted that, because the terminal device does not synchronize with the SSB in the asynchronous raster in an initial access process, the frequency domain index of the SSB may be indicated to the terminal device by using the system information or the another signaling indication method. The network device may synchronize with an SSB in a synchronization raster. Therefore, the frequency domain index of the SSB can be obtained in the another form. For example, a frequency domain index of the SSB in the synchronization raster may be indicated in the SSB, for example, indicated by using an SS in the synchronization signal block.

Optionally, when only one frequency domain SSB is in the synchronization raster, the network device may indicate all frequency domain indexes of SSBs by using the system information or the signaling indication method. In this manner, after detecting an SSB, the terminal device #A may learn that an index of the detected SSB is in the frequency domain. In addition, all the frequency domain indexes of the SSBs are indicated in the data channel, and an index range that can be indicated is wide.

Optionally, the terminal device and the network device may prestore a correspondence between index indication information of an SSB and an SSB index. The terminal device #A obtains the indication information, and may learn of the synchronization signal block index based on an index relationship between the indication information and the SSB.

It should be understood that the terminal device #A may determine, based on the indication information sent by the network device, the SSB index detected by the terminal device. Correspondingly, when sending the SSB, the network device includes the index information of the SSB in the SSB. For example, the frequency domain index is carried by using a synchronization signal of the SSB. Alternatively, the network device may send the indication information (namely, the second information) to the terminal device. The indication information carries the SSB index. For another example, the network device and the terminal device #A may store a correspondence between indication information and an SSB index. When the network device sends the indication information to the terminal device #A, the terminal device #A may determine the SSB index based on the stored correspondence.

Optionally, the method 300 further includes the following steps:

S330: The terminal device #A obtains a quasi-co-location QCL relationship between the M SSBs and/or antenna port information of the M SSBs. The QCL relationship and/or the antenna port information of the M SSBs are/is used to jointly measure a large-scale parameter and/or jointly demodulate data.

The terminal device #A may determine the QCL relationship between the plurality of SSBs and the antenna port information of the plurality of SSBs based on the QCL relationship indicated by the network device or specified in a communication protocol. For example, the network device may indicate a specific large-scale property of the QCL. For another example, one or more specific large-scale properties, such as spatial domain QCL and/or average gain QCL, may be specified in the protocol.

The terminal device #A obtains the QCL relationship between the SSBs or whether the SSBs have a same port, and jointly measures the large-scale QCL parameter and/or jointly demodulates the data, to obtain a more accurate measurement value.

Optionally, the network device may perform indication by using synchronization information SS, a system message, or other signaling.

It should be understood that, the QCL relationship herein includes one or more of the large-scale properties. Specifically, the large-scale properties include delay spread, an average delay, Doppler spread, a Doppler frequency shift, an average gain, a receiving parameter, a receive beam number of the terminal device, transmitting/receiving channel correlation, a receiving angle of arrival, spatial correlation (spatial QCL) of a receiver antenna, a dominant angle of arrival (AoA), an average angle of arrival, AoA spread, and the like.

Optionally, the terminal device #A may determine, based on second indication information sent by the network device, that a plurality of SSBs in the M SSBs have the QCL relationship and/or the antenna port information.

For example, frequency-division SSBs do not have the QCL relationship by default. A network side indicates that the frequency-division SSBs have the QCL relationship, or indicates that the frequency-division SSBs have a same port. Frequency-division SSBs in the synchronization raster do not have the QCL relationship by default, or the network device indicates that frequency-division SSBs in the synchronization raster do not have the QCL relationship. An SSB in the asynchronous raster and a specific SSB in the synchronization raster have the QCL relationship or have a same port. It should be understood that, in the initial access process, the terminal device cannot detect the SSB in the asynchronous raster, and the SSB in the asynchronous raster is configured to have the QCL relationship or the same port with the specific SSB in the synchronization raster, and therefore, the SSB in the asynchronous raster can be sent by using a same beam or a similar beam as the specific SSB in the synchronization raster, and the large-scale parameter can be jointly measured and/or the data can be jointly demodulated, to obtain good detection and demodulation performance.

Optionally, the second indication information may be the synchronization information SS, the system message, or the like. This is not limited in this embodiment of this application.

Optionally, the N first SSBs do not have the QCL relationship. That the terminal device #A obtains the QCL relationship between the M SSBs and/or antenna port information of the M SSBs includes: determining, based on third indication information sent by the network device, that a second SSB and a third SSB have the QCL relationship. The second SSB is one of the SSBs that are of the M SSBs and that are located in the asynchronous raster. The third SSB is one of the N first SSBs that has a first relationship with the second SSB. The first relationship is an adjacent relationship of a frequency domain position, a frequency domain index, or a frequency value.

Optionally, the terminal device #A may further determine, according to a specification of the communication protocol, that the second SSB and the third SSB have the QCL relationship. The second SSB is one of the SSBs that are of the M SSBs and that are located in the asynchronous raster. The third SSB is one of the N first SSBs that has a first relationship with the second SSB. The first relationship is an adjacent relationship of a frequency domain position, a frequency domain index, or a frequency value.

For example, in the M frequency-division SSBs sent by the network device, the N SSBs located in the synchronization raster do not have the QCL relationship, and the SSB located in the asynchronous raster and the SSB located in the synchronization raster have a QCL relationship. Specifically, for example, the N SSBs located in the synchronization raster are an SSB #1, an SSB #2, . . . , and an SSB #N, and M−N SSBs located in the asynchronous raster are an SSB #(N+1), an SSB #(N+2), . . . , and an SSB #M. That a second SSB and a third SSB have the QCL relationship may be understood as that the SSB #1 and the SSB #M have the QCL relationship, and the SSB #1 and the SSB #M are adjacent in a frequency domain position, the SSB #1 and the SSB #M are adjacent in a frequency domain index, or the SSB #1 and the SSB #M are adjacent in a frequency value.

In a possible implementation, the SSB in the asynchronous raster and an SSB in an adjacent synchronization raster have the QCL relationship or a same port. When distances between the SSB in the asynchronous raster and two SSBs are equal, an SSB having a low or high frequency is configured to have the QCL relationship or the same antenna port with the SSB in the synchronization raster, or an SSB having a large or small frequency domain SSB index is configured to have the QCL relationship or the same antenna port with the SSB in the synchronization raster.

In a possible implementation, the SSB in the asynchronous raster and an SSB in a closest synchronization raster whose frequency is lower than that of the asynchronous raster have the QCL relationship or a same port; or the SSB in the asynchronous raster and an SSB in a closest synchronization raster whose frequency is higher than that of the asynchronous raster have the QCL relationship or a same port.

In a possible implementation, the SSB in the asynchronous raster and an SSB in a closest synchronization raster whose frequency domain SSB index is smaller than that of the asynchronous raster have the QCL relationship or a same port; or the SSB in the asynchronous raster and an SSB in a closest synchronization raster whose frequency domain SSB index is larger than that of the asynchronous raster have the QCL relationship or a same port.

Optionally, frequency-division SSBs have the QCL relationship or a same port by default. The network device indicates, by using fourth indication information, that the frequency-division SSBs do not have the QCL relationship or do not have the same port.

Optionally, the terminal device #A and the network device may store indication information indicating that frequency domain SSBs have the QCL relationship and/or an antenna port relationship. The terminal device may determine the QCL and/or antenna port relationship between the SSBs based on the indication information sent by the network device.

In the initial access process, the terminal device #A may jointly measure the large-scale QCL parameter and/or jointly demodulate the data based on the obtained QCL relationship between the plurality of SSBs and/or the obtained antenna port information. For example, two SSBs received by the terminal device #A have the QCL relationship. It may be assumed that the two SSBs are sent by the same beam, and beam quality of transmit beams corresponding to the two SSBs is estimated, and/or transmitted system information corresponding to the two SSBs are jointly demodulated. The terminal device #A may detect an SSB sent by a beam covering the terminal device #A, and may learn of, based on the QCL relationship between different SSBs, beam quality of beams that send different SSBs. The terminal device #A may select an SSB corresponding to best beam quality to perform the subsequent initial access process.

S340: The terminal device #A sends the random access signal to the network device based on a frequency domain position of the detected first SSB in the M SSBs or in the N first SSBs.

It should be understood that the random access signal is used by the terminal device #A to perform a random access process with the network device.

It should be noted that after detecting the SSB sent by the network device, the terminal device may initiate random access to the network device based on a frequency position of the first SSB in the frequency-division SSBs. Specifically, the random access signal may be sent to the network device based on the frequency domain position of the first SSB in the M SSBs, or the random access signal may be sent to the network device based on the frequency domain position of the first SSB in the N first SSBs.

For example, the terminal device #A determines, based on the frequency domain position of the detected first SSB in the M SSBs or in the N first SSBs, a time domain resource position and/or a frequency domain resource position used to send the random access signal.

Correspondingly, the network device receives the random access signal sent by the terminal device #A, and performs initial access to the terminal device based on the random access signal, for example, send a random access response message, namely, a second message (Msg2), to the terminal device #A based on the received random access signal. It should be noted that after receiving the random access signal sent by the terminal device #A, the network device may learn of a status of the SSB detected by the terminal device #A, and then send the Msg2 to the terminal device #A through a beam used for sending the SSB.

In the initial access process, the synchronization signal block SSB is associated with a random access resource RO. The terminal device #A detects the SSB sent by the network device, and initiates random access based on the RO associated with the detected SSB. The network device receives the random access signal sent by the terminal device #A on the RO, learns of the SSB that can be detected by the terminal device #A, and sends the random access response through the beam of the SSB.

Optionally, the terminal device #A determines a first random access occasion (RACH occasion, RO) based on the detected first SSB and a first mapping relationship, and sends a random access signal based on the first RO. The first correspondence includes a correspondence between the M SSBs and P ROs. It should be understood that the M SSBs are frequency-division SSBs, and the M SSBs may include an SSB located in a synchronous raster, or include SSBs located in the synchronization raster and the asynchronous raster.

Figure 7:
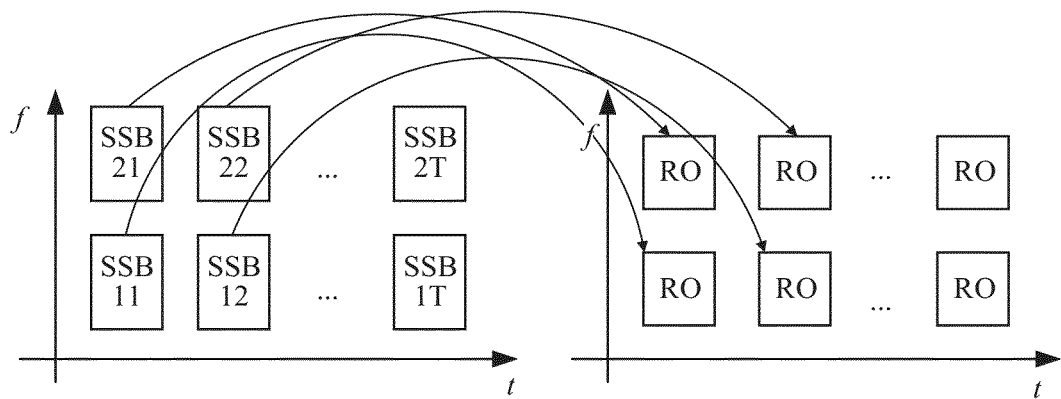
FIG. 7 is a schematic diagram of a mapping relationship between synchronization signal blocks and random access resources according to an embodiment of this application.

Optionally, the first correspondence may be a relationship obtained by performing mapping in a frequency domain-first order of the SSB. A plurality of frequency-division SSBs can be mapped to the same RO in the frequency domain-first order, so that the plurality of frequency-division SSBs are effectively supported in sending through different digital beams. The frequency domain-first order may be understood as that mapping is performed in a frequency order of the SSB, or may be understood as that mapping is performed in a frequency-domain order and a time-domain order of the SSB. The mapping relationship obtained in the frequency domain-first order is specifically as follows:

In an optional implementation, the first correspondence is a one-to-one mapping relationship between the M SSBs and the P ROs in the frequency domain-first order, where M=P. For example, FIG. 7 is a schematic diagram of a mapping relationship between synchronization signal blocks and random access resources according to an embodiment of this application. As shown in FIG. 7, frequency-division SSBs are mapped to ROs in a one-to-one manner based on a frequency domain priority.

Figure 8:
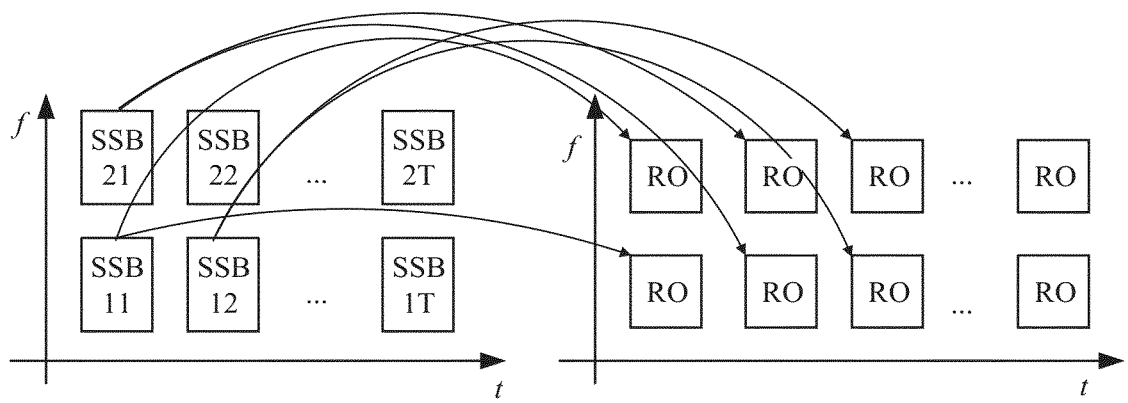
FIG. 8 is a schematic diagram of another mapping relationship between synchronization signal blocks and random access resources according to an embodiment of this application.

In an optional implementation, a first correspondence may alternatively be a mapping relationship between each of M SSBs and a plurality of ROs in P ROs in a frequency domain-first order. For example, one SSB may be mapped to a plurality of ROs that have a same time domain resource and different frequency domain resources. FIG. 8 is a schematic diagram of another mapping relationship between synchronization signal blocks and random access resources according to an embodiment of this application. As shown in FIG. 8, one SSB corresponds to two ROs.

Figure 9:
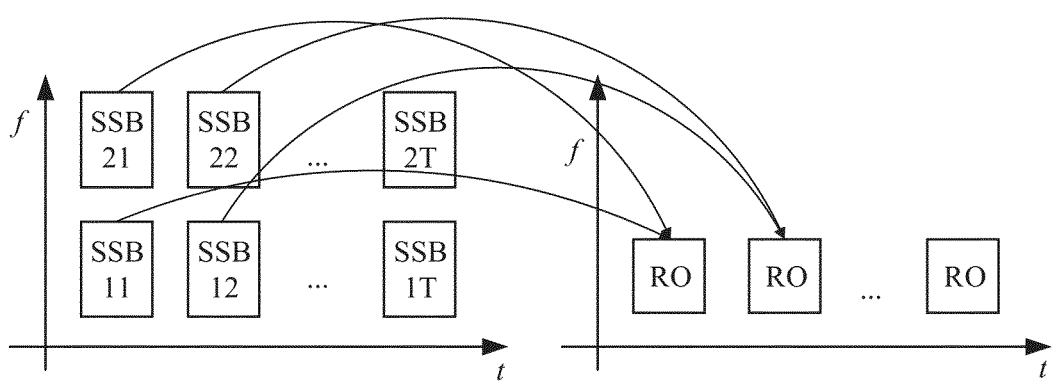
FIG. 9 is a schematic diagram of still another mapping relationship between synchronization signal blocks and random access resources according to an embodiment of this application.

In an optional implementation, a first correspondence may alternatively be a mapping relationship between at least two of M SSBs and one of P ROs in a frequency domain-first order. For example, a plurality of frequency-division SSBs are mapped to one RO. FIG. 9 is a schematic diagram of still another mapping relationship between synchronization signal blocks and random access resources according to an embodiment of this application. As shown in FIG. 9, two frequency-division SSBs correspond to one RO. For another example, a plurality of frequency-division SSBs may correspond to different ROs, such as four frequency-division SSBs (an SSB #11, an SSB #21, an SSB #31, and an SSB #41, where the SSB #31 and the SSB #41 are not shown in FIG. 9). The SSB #11 and the SSB #21 are mapped to the same RO, and the SSB #31 and the SSB #41 are mapped to one RO.

It should be noted that a frequency-first order may be a frequency-first order of a plurality of frequency-division SSBs.

Optionally, a network device may configure random access sequence resources corresponding to a plurality of SSBs mapped to the same RO. For example, the network device configures that a terminal corresponding to each SSB may use the same random access sequence resource to initiate random access. In this case, the network device may distinguish between the SSBs corresponding to the terminals by using digital beams. For another example, the network device may configure that a terminal corresponding to each SSB uses different random access sequence resources to initiate random access. In this case, the network device may distinguish between the SSBs corresponding to the terminals by using the random access sequence resources. Alternatively, one of the configurations is considered in a protocol by default.

Optionally, a first correspondence may alternatively be a relationship obtained by mapping M frequency-division SSBs to each of at least one RO, and the at least one RO is at least one of P ROs.

For example, the M frequency-division SSBs are mapped to one RO, or the M frequency-division SSBs are mapped to a plurality of ROs, and each RO corresponds to the M frequency-division SSBs. It should be noted that, mapping a plurality of frequency-division SSBs to one RO can reduce overheads for indicating a mapping relationship between an SSB and an RO.

Optionally, the network device may configure that a terminal device corresponding to each frequency-division SSB uses the same random access sequence resource to initiate random access, or configure that a terminal corresponding to each SSB uses different random access sequence resources to initiate random access, or one of the configurations is considered in a communication protocol by default.

Optionally, SSBs having a QCL relationship or having the same antenna port may be considered as the same SSB to be mapped to an RO. Specifically, the SSBs having the QCL relationship are considered as one SSB to be mapped to the RO, or the SSBs having the same antenna port are considered as one SSB to be mapped to the RO.

Optionally, a network side configures that terminals corresponding to SSBs having a QCL relationship or the same antenna port use the same random access sequence resource to initiate random access, or the network device configures that a terminal corresponding to each SSB uses different random access sequence resources to initiate random access, or one of the configurations is considered in a communication protocol by default.

Figure 10:
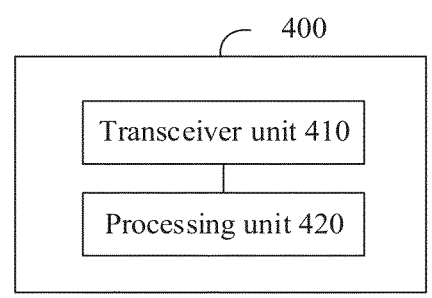
FIG. 10 is a schematic block diagram of a communication apparatus according to an embodiment of this application.

FIG. 10 is a schematic block diagram of a communication apparatus 400 according to an embodiment of this application. The apparatus 400 includes a transceiver unit 410 and a processing unit 420. The transceiver unit 410 may communicate with the outside, and the processing unit 420 is configured to process data. For example, the processing unit 420 may be configured to perform detection. For another example, the processing unit 420 may be further configured to perform obtaining. The transceiver unit 410 may also be referred to as a communication interface or a communication unit.

Optionally, the apparatus 400 may further include a storage unit. The storage unit may be configured to store instructions and/or data. The processing unit 420 may read the instructions and/or the data in the storage unit.

The apparatus 400 may be configured to perform actions performed by the terminal device #A in the foregoing method embodiments. In this case, the apparatus 400 may be a terminal device, or a component, a chip, or the like configured in the terminal device. The transceiver unit 410 is configured to perform receiving and sending-related operations of the terminal device in the foregoing method embodiments. The processing unit 420 is configured to perform related processing operations on a first communication apparatus side in the foregoing method embodiments. For example, the processing-related operations may include a detecting operation, an obtaining operation, and the like.

For example, the processing unit 420 is configured to detect M synchronization signal blocks SSBs sent by a network device, where the M SSBs are sent at a same time point and at different frequencies, the M SSBs include N first SSBs, the first SSB is an SSB located in a synchronization raster, and N is a positive integer. The transceiver unit 410 is configured to send a random access signal to the network device based on a frequency domain position of the detected first SSB in the M SSBs or in the N first SSBs. The processing unit 420 is further configured to obtain a first index of the first SSB, where the first index is an index of the first SSB in the M SSBs, or the first index is an index of the first SSB in the N first SSBs; and the processing unit is further configured to determine, based on the first index, a time domain position and/or a frequency domain position used for sending the random access signal.

Alternatively, the apparatus 400 may be configured to perform actions performed by the network device in the foregoing method embodiments, the transceiver unit 410 is configured to perform receiving and sending-related operations of the network device in the foregoing method embodiments, and the processing unit 420 is configured to perform processing-related operations of the network device in the foregoing method embodiments.

For example, the transceiver unit 410 is configured to send M synchronization signal blocks SSBs, where the M SSBs are sent at a same time point and at different frequencies, the M SSBs include N first SSBs, the first SSB is an SSB located in a synchronization raster, and N is a positive integer. The transceiver unit 410 is further configured to receive a random access signal sent by a terminal device, and the random access signal is sent by the terminal device based on a frequency domain position of the detected first SSB in the M SSBs or in the N first SSBs. The processing unit 420 is configured to determine a first index based on a time domain position and/or a frequency domain position of the random access signal, where the first index is an index of the first SSB in the M SSBs, or the first index is an index of the first SSB in the N first SSBs. The transceiver unit 410 is further configured to send first indication information, where the first indication information indicates the terminal device to obtain the first index, and the first indication information is carried in at least one of a synchronization signal SS, a physical broadcast channel PBCH demodulation reference signal DMRS, a PBCH, a reference signal RS, a system message, a data channel, or a control channel.

Figure 11:
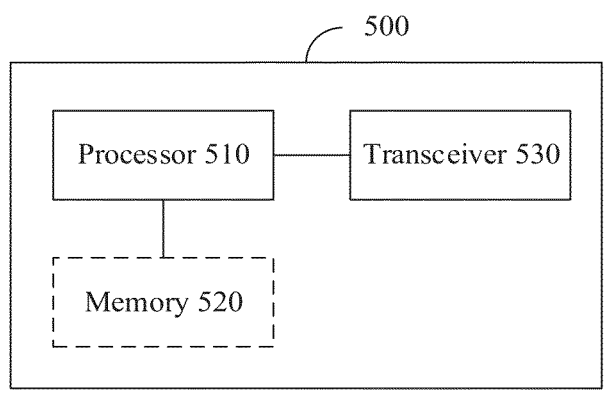
FIG. 11 is another schematic block diagram of a communication apparatus according to an embodiment of this application.

As shown in FIG. 11, an embodiment of this application further provides a communication apparatus 500. The communication apparatus 500 includes a processor 510. The processor 510 is coupled to a memory 520. The memory 520 is configured to store a computer program or instructions and/or data. The processor 510 is configured to execute the computer program or the instructions and/or the data stored in the memory 520, to enable the method in the foregoing method embodiments to be executed.

Optionally, the communication apparatus 500 includes one or more processors 510.

Optionally, as shown in FIG. 11, the communication apparatus 500 may further include the memory 520.

Optionally, the communication apparatus 500 includes one or more memories 520.

Optionally, the memory 520 may be integrated with the processor 510, or separately disposed.

Optionally, as shown in FIG. 11, the wireless communication apparatus 500 may further include a transceiver 530. The transceiver 530 is configured to receive and/or send a signal. For example, the processor 510 is configured to control the transceiver 530 to receive and/or send a signal.

In a solution, the communication apparatus 500 is configured to perform operations performed by the network device in the foregoing method embodiments.

For example, the processor 510 is configured to perform processing-related operations performed by the network device in the foregoing method embodiments, and the transceiver 530 is configured to perform receiving and sending-related operations performed by the network device in the foregoing method embodiments.

For example, the transceiver 530 may be configured to send M synchronization signal blocks SSBs, where the M SSBs are sent at a same time point and at different frequencies, the M SSBs include N first SSBs, the first SSB is an SSB located in a synchronization raster, and N is a positive integer. The transceiver 530 is further configured to receive a random access signal sent by a terminal device, and the random access signal is sent by the terminal device based on a frequency domain position of the detected first SSB in the M SSBs or in the N first SSBs. The processor 510 is configured to determine a first index based on a time domain position and/or a frequency domain position of the random access signal, where the first index is an index of the first SSB in the M SSBs, or the first index is an index of the first SSB in the N first SSBs. The processor 510 is further configured to determine, based on a first random access occasion RO and a first correspondence, the first SSB that can be detected by the terminal device, where the first RO is an RO used for receiving the random access signal, the first correspondence includes a correspondence between the M SSBs and P ROs, and P is a positive integer.

In another solution, the communication apparatus 500 is configured to perform operations performed by the terminal device in the foregoing method embodiments.

For example, the processor 510 is configured to perform processing-related operations performed by the terminal device in the foregoing method embodiments, and the processing-related operations may include a detecting operation, an obtaining action, and the like. The transceiver 530 is configured to perform receiving and sending-related operations performed by the terminal device in the foregoing method embodiments.

For example, the processor 510 is configured to detect M synchronization signal blocks SSBs sent by a network device, where the M SSBs are sent at a same time point and at different frequencies, the M SSBs include N first SSBs, the first SSB is an SSB located in a synchronization raster, and N is a positive integer; and the processor 510 is further configured to generate N preamble sequences based on a first quantity N and a first cyclic shift value. The transceiver 530 is configured to send a random access signal to the network device based on a frequency domain position of the detected first SSB in the M SSBs or in the N first SSBs.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments according to this application, it should be understood that the disclosed systems, apparatuses, and methods may be implemented in other manners. For example, the described apparatus embodiments are merely examples. For example, division into the units is merely logical function division and there may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An initial access method, comprising:
   detecting, in M synchronization signal blocks (SSBs) sent by a network device, one or more first SSBs, wherein the M SSBs are sent at a same time on different frequencies, wherein the M SSBs comprise N first SSBs located in a synchronization raster and M–N second SSBs located in an asynchronous raster, wherein a frequency domain spacing between the first SSBs and adjacent second SSBs is determined based on $m \times \Delta f_1 + n \times \Delta f_2$, where $\Delta f_1$ represents a first frequency spacing, $\Delta f_2$ represents a second frequency spacing, m and n are nonnegative integers, wherein M and N are positive integers; and
   sending a random access signal to the network device based on frequency domain positions of the detected one or more SSBs in the M SSBs or in the N first SSBs.

2. The method according to claim 1, wherein the method further comprises:
   obtaining a first index of the one or more first SSBs, wherein the first index is an index of the one or more first SSBs in the M SSBs, or an index of the one or more first SSBs in the N first SSBs; and
   determining, based on the first index, a time domain position or a frequency domain position for sending the random access signal.

3. The method according to claim 2, wherein the obtaining a first index of the first one or more SSBs comprises:
   obtaining the first index based on first indication information sent by the network device, wherein the first indication information is carried in at least one of a synchronization signal (SS), a physical broadcast channel (PBCH) demodulation reference signal (DMRS), a PBCH, a reference signal (RS), a system message, a data channel, or a control channel.

4. The method according to claim 1, wherein N equals 1, and wherein the detecting M SSBs sent by a network device comprises:
   detecting, at a first frequency domain position, a first SSB sent by the network device, wherein the first SSB has a highest or lowest frequency or frequency index in the M SSBs.

5. The method according to claim 4, wherein the detecting M SSBs sent by a network device further comprises:
   detecting M–1 second SSBs at a position separated by $m\Delta f_1 + n\Delta f_2$ from the first frequency domain position, wherein a second SSB is an SSB in the M SSBs and located in an asynchronous raster.

6. The method according to claim 1, wherein a spacing between frequency domain positions of two adjacent SSBs in the M SSBs is $\Delta f_3$, and $\Delta f_3$ represents a third frequency spacing.

7. The method according to claim 5, wherein the method further comprises:
   obtaining a quasi-co-location (QCL) relationship or antenna port information of the M SSBs, wherein the QCL relationship or the antenna port information of the M SSBs is used to jointly measure a large-scale parameter or jointly demodulate data.

8. The method according to claim 7, wherein the obtaining a quasi-co-location QCL relationship or antenna port information of the M SSBs comprises:
   determining, based on second indication information sent by the network device, that a plurality of SSBs in the M SSBs have the QCL relationship or the antenna port information.

9. The method according to claim 7, wherein the N first SSBs lacks the QCL relationship, and
   the obtaining a quasi-co-location QCL relationship or antenna port information of the M SSBs comprises:
   determining, based on third indication information sent by the network device, that a second SSB and a third SSB have the QCL relationship, wherein the second SSB is one of the M SSBs and located in the asynchronous raster, the third SSB is one of the N first SSBs that has a first relationship with the second SSB, and the first relationship is an adjacent relationship of a frequency domain position, a frequency domain index, or a frequency value.

10. The method according to claim 1, wherein the sending a random access signal used for initial access to the network device comprises:
   determining a first random access channel occasion (RO) based on the detected one or more first SSBs and a first correspondence between the M SSBs and P ROs, and P is a positive integer; and
   sending the random access signal on the first RO.

11. The method according to claim 10, wherein the first correspondence is one of the following relationships:
   a one-to-one mapping relationship between the M SSBs and the P ROs in a frequency domain-first order, wherein M=P;
   a mapping relationship between each of the M SSBs and a plurality of ROs in the P ROs in a frequency domain-first order;
   a mapping relationship between at least two of the M SSBs and one of the P ROs in a frequency domain-first order; or
   a mapping relationship between the M SSBs and each of at least one RO, wherein the at least one RO is at least one of the P ROs.

12. An apparatus, comprising:
   at least one processor; and
   one or more memories coupled to the at least one processor and storing programming instructions for execution by the at least one processor to perform operations comprising:
      detecting, in M synchronization signal blocks (SSBs) sent by a network device, one or more first SSBs, wherein the M SSBs are sent at a same time on different frequencies, wherein the M SSBs comprise N first SSBs located in a synchronization raster and M-N second SSBs located in an asynchronous raster, wherein a frequency domain spacing between the first SSBs and adjacent second SSBs is determined based on $m \times \Delta f_1 + n \times \Delta f_2$, where $\Delta f_1$ represents a first frequency spacing, $\Delta f_2$ represents a second frequency spacing, m and n are nonnegative integers, wherein M and N are positive integers; and
   sending a random access signal to the network device based on frequency domain positions of the detected one or more SSBs in the M SSBs or in the N first SSBs.

13. The apparatus according to claim 12, wherein the operations further comprising:
   obtaining a first index of the one or more first SSBs, wherein the first index is an index of the one or more first SSBs in the M SSBs, or an index of the one or more first SSBs in the N first SSBs; and
   determining, based on the first index, a time domain position or a frequency domain position for sending the random access signal.

14. The apparatus according to claim 13, wherein the obtaining a first index of the first one or more SSBs comprises:
   obtaining the first index based on first indication information sent by the network device, wherein the first indication information is carried in at least one of a synchronization signal (SS), a physical broadcast channel (PBCH) demodulation reference signal (DMRS), a PBCH, a reference signal (RS), a system message, a data channel, or a control channel.

15. The apparatus according to claim 12, wherein N equals 1, and wherein the detecting M SSBs sent by a network device comprises:
   detecting, at a first frequency domain position, a first SSB sent by the network device, wherein the first SSB has a highest or lowest frequency or frequency index in the M SSBs.

16. The apparatus according to claim 15, wherein the detecting M SSBs sent by a network device further comprises:
   detecting M−1 second SSBs at a position separated by $m\Delta f_1 + n\Delta f_2$ from the first frequency domain position, wherein a second SSB is an SSB in the M SSBs and located in an asynchronous raster.

17. The apparatus according to claim 12, wherein a spacing between frequency domain positions of two adjacent SSBs in the M SSBs is $\Delta f_3$, and $\Delta f_3$ represents a third frequency spacing.

18. The apparatus according to claim 12, wherein the operations further comprising:
   obtaining a quasi-co-location (QCL) relationship or antenna port information of the M SSBs, wherein the QCL relationship or the antenna port information of the M SSBs is used to jointly measure a large-scale parameter or jointly demodulate data.

19. The apparatus according to claim 18, wherein the obtaining a quasi-co-location QCL relationship or antenna port information of the M SSBs comprises:
   determining, based on second indication information sent by the network device, that a plurality of SSBs in the M SSBs have the QCL relationship or the antenna port information.

20. A non-transitory, computer-readable medium storing one or more instructions executable by at least one processor to perform operations comprising:
   detecting, in M synchronization signal blocks (SSBs) sent by a network device, one or more first SSBs, wherein the M SSBs are sent at a same time on different frequencies, wherein the M SSBs comprise N first SSBs located in a synchronization raster and M−N second SSBs located in an asynchronous raster, wherein a frequency domain spacing between the first SSBs and adjacent second SSBs is determined based on $m \times \Delta f_1 + n \times \Delta f_2$, where $\Delta f_1$ represents a first frequency spacing, $\Delta f_2$ represents a second frequency spacing, m and n are nonnegative integers, wherein M and N are positive integers; and
   sending a random access signal to the network device based on frequency domain positions of the detected one or more SSBs in the M SSBs or in the N first SSBs.

* * * * *